UNITED STATES PATENT OFFICE.

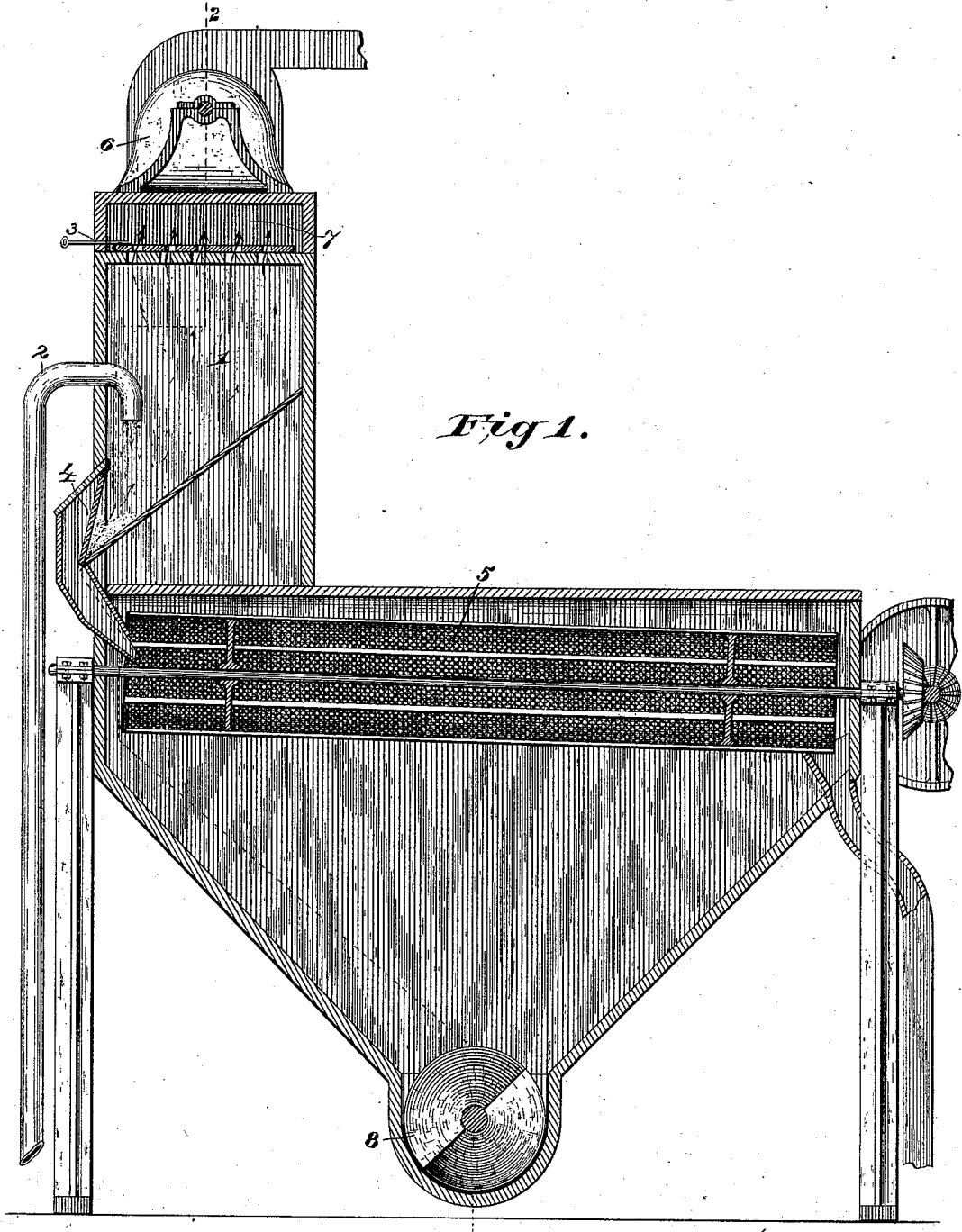

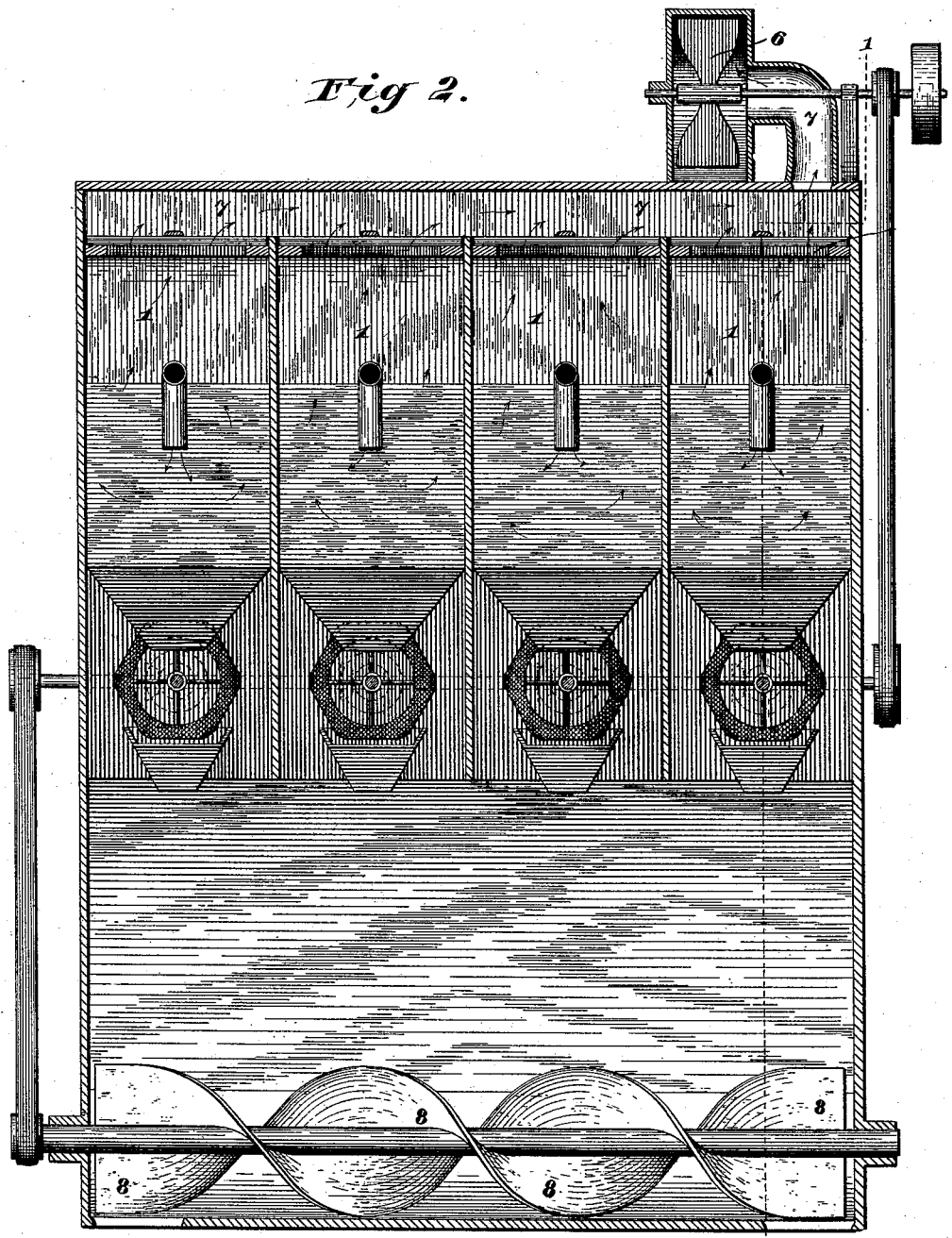

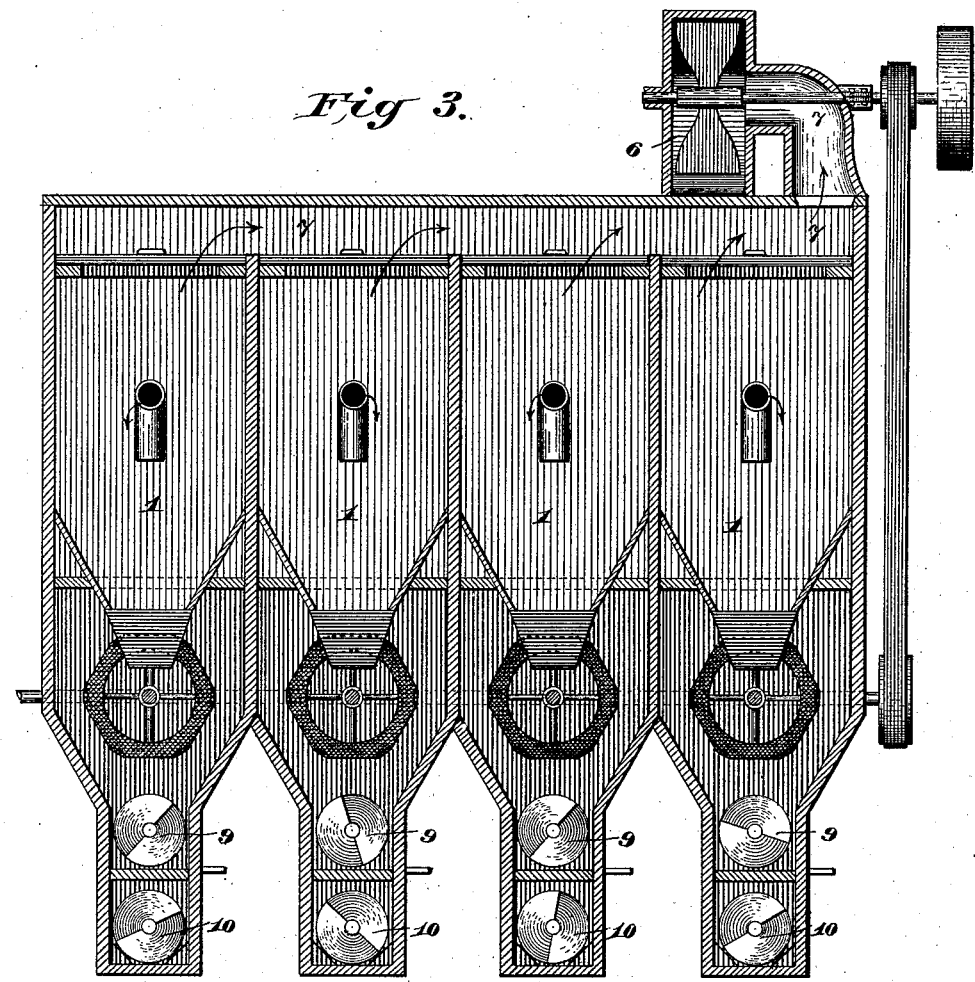

JOHN M. CASE, OF COLUMBUS, OHIO, ASSIGNOR TO THE CASE MANUFACTURING COMPANY, OF SAME PLACE.

ATMOSPHERIC ELEVATOR FOR FLOUR-BOLTS.

SPECIFICATION forming part of Letters Patent No. 297,758, dated April 29, 1884.

Application filed May 31, 1883. (No model.)

*To all whom it may concern:*

Be it known that I, JOHN M. CASE, a citizen of the United States, residing at Columbus, in the county of Franklin and State of Ohio, have invented certain new and useful Improvements in Atmospheric Elevators for Flour-Bolts, of which the following is a specification.

This invention is one of a series used in my improved system of atmospheric elevation in flour-mills.

It consists in a rotary bolt or a series of bolts which are supplied with material from an air-pipe or series of air-pipes communicating with settling-chambers, as hereinafter more fully explained.

It has heretofore been the custom in bolting to elevate the material by a belt and bucket, or by a pneumatic elevator, and then use the exhaust produced by a fan for purifying the material and carrying off the dust while on the bolt. This carrying off of dust is not effected, however, until the material has reached the bolt and is being agitated thereon; hence, as the material is not subjected to the purification until it is more or less distributed over the screen and more or less of the fine dust lodged or caught in the meshes thereof, it requires the use of a brush or knocker to free it and place it in position to be carried off by the air-blast. In my machine the material is elevated to the hopper and subjected to the purifying blast of air, which relieves it of its dust and impurities before it is delivered to the bolt. It is highly desirable that the dust should be carried off at this stage of the process, for the reason that if it were permitted to come in contact with the screen it would not only require the use of a brush or knocker to free it, as above stated, but would, notwithstanding said knocker, clog the meshes to a greater or less extent. The use of a brush or knocker is also well known to aid materially in destroying the bolting-cloth. It will therefore be seen that the result is not only much better, but the means for producing it are much cheaper and less complicated.

In the accompanying drawings, Figure 1 is a vertical section on the line 1 1, Fig. 2, showing the settling-chamber, fan, air-partitions, bolt, and conveyer. Fig. 2 is a vertical transverse section of the same on the line 2 2, Fig. 1. Fig. 3 represents a modification of my invention, in which separate double conveyers are used under each bolt of the series, instead of a single conveyer common to all, as represented in Fig. 1.

In carrying out my invention I employ a dead-air settling-chamber, 1, into which chamber delivers an air-pipe, 2. Any desired number of these settling-chambers are employed. They are made practically air-tight, and connect by a common air trunk and pipe, 7, with the suction-fan 6, so that the said fan receives its supply of air only through the settling chamber or chambers. Immediately over the settling-chamber 1, or at any convenient or desirable point, I arrange valves 3, for regulating the strength of current necessary to elevate the material which is to be supplied to the bolt. I also provide a valve, 4, at the discharge-port of the settling air-chamber, which valve is so arranged that by the accumulated weight of the material it will be opened, allowing the material which has been elevated to discharge itself into the bolt 5, and at the same time prevent the admission of air into the settling-chamber from the bolting-chest. The air settling-chamber may be constructed in any form desired, and in proportions which are found to be most desirable, but should under all circumstances be sufficiently large in proportion to the ducts 2 to allow the settling of the material without being drawn out through the discharge-ports into the fan or dust-arrester, except light fibrous material, which matter will be arrested by dust-catchers, as shown in other applications of mine of even date herewith. The air-pipe 2, connecting with the rolls or other part of the mill whence material is to be elevated, is in practice very small, supplying a thin stream of air traveling with great rapidity. This small body of air becomes distributed within the settling-chamber in such a manner that the current passing out through the suction-pipe passes off very slowly, owing to its greatly-increased distribution, thus allowing the settling of the flour, &c., and permitting merely the expulsion of the dust and lighter impurities.

On the plan above described I construct a series of these air-chambers, which may or may not be directly connected with the bolts. These settling air-chambers may occupy a floor immediately above the bolts, or may be directly connected therewith. They may be constructed singly or in any number desired. The pipes leading into these settling air-chambers may connect with the rolls, purifiers, or bolts, or any machine in the mill where it becomes necessary to elevate material for the purpose of bolting or making separations of any kind. The fan to exhaust the air from the settling-chambers may be located immediately above the bolt, as represented in the drawings, or in any desired position in the mill, connection being made with the air-chambers by air-conduits leading to the fan.

In short reels and in gradual-reduction milling, where the material is all of the same kind, and is subjected to a sifting process after each successive reduction, and is sent for rebolting to one common separating-reel, I use the construction represented in Figs. 1 and 2, having one common conveyer, 8, connected with a series of short reels; but in a system of bolting where large capacity is required I use the construction represented in Fig. 3, with separate conveyers 9 for each bolt, or separate conveyers 9 10, for carrying the products from different portions of a graded reel under control of customary cut-offs, 11. Bolts below the ones represented may be indefinitely multiplied.

I am aware that it is not new to use pneumatic elevators and dust-separators in the art of milling, and also that it is not new to elevate mill products to a shaking bolt by the same means, and do not claim such as my invention.

Having thus described my invention, the following is what I claim as new and desire to secure by Letters Patent:

1. The combination, with a rotary flour-bolt, of a pneumatic elevating-pipe, a settling-chamber or bolt-hopper of much larger area, into which said pipe delivers, a suction-fan exhausting the air and dust from said settling-chamber, and a feed-spout conducting from said chamber to the bolt, whereby the dust and impurities are carried off before the material reaches the bolt, as set forth.

2. The combination of the rotary bolt 5, elevating-pipe 2, suction-fan 6, settling-chamber 1, valve 3, and automatic valve 4, substantially as and for the purposes set forth.

3. The combination of a series of rotary bolts, 5, pneumatic elevating-pipes 2, settling-chambers 1, and an air-trunk and suction-fan common to all, substantially as shown and described.

4. The combination of a bolting-reel, a fan, an elevating-tube, and a practically air-tight settling chamber or hopper into which a current of air is drawn, and the material to be bolted thereby elevated and purified by one common fan before it reaches the bolt, as set forth.

JOHN M. CASE.

Witnesses:
OCTAVIUS KNIGHT,
HARRY E. KNIGHT.